United States Patent
Amthor et al.

(10) Patent No.: US 12,393,008 B2
(45) Date of Patent: Aug. 19, 2025

(54) METHOD AND DEVICE FOR CAPTURING MICROSCOPY OBJECTS IN IMAGE DATA

(71) Applicant: Carl Zeiss Microscopy GmbH, Jena (DE)

(72) Inventors: Manuel Amthor, Jena (DE); Daniel Haase, Zoellnitz (DE); Alexander Freytag, Erfurt (DE); Christian Kungel, Penzberg (DE)

(73) Assignee: Carl Zeiss Microscopy GmbH, Jena (DE)

( * ) Notice: Subject to any disclaimer, the term of this patent is extended or adjusted under 35 U.S.C. 154(b) by 459 days.

(21) Appl. No.: 17/828,154

(22) Filed: May 31, 2022

(65) Prior Publication Data

US 2022/0390735 A1    Dec. 8, 2022

(30) Foreign Application Priority Data

Jun. 2, 2021 (DE) ............ 10 2021 114 351.9

(51) Int. Cl.
*G06T 5/50* (2006.01)
*G02B 21/36* (2006.01)

(52) U.S. Cl.
CPC ............. *G02B 21/361* (2013.01); *G06T 5/50* (2013.01); *G02B 21/367* (2013.01); *G06T 2207/10056* (2013.01); *G06T 2207/20084* (2013.01)

(58) Field of Classification Search
CPC ...... G02B 21/361; G02B 21/367; G06T 5/50; G06T 2207/10056; G06T 2207/20084; G06T 5/60; G06T 2207/30024; G06T 7/11; G06T 7/0012; G06T 7/90; G06T 2207/10061

USPC ......................................................... 382/103
See application file for complete search history.

(56) References Cited

U.S. PATENT DOCUMENTS

| | | | | |
|---|---|---|---|---|
| 2013/0286038 A1* | 10/2013 | Kamath | ............... | G06T 7/0012 |
| | | | | 345/592 |
| 2020/0264422 A1* | 8/2020 | Kalkbrenner | ...... | G02B 21/0056 |
| 2021/0156782 A1* | 5/2021 | Holm | ................ | G01N 15/1433 |
| 2021/0256701 A1* | 8/2021 | Nozaki | ................ | G16H 50/30 |

(Continued)

OTHER PUBLICATIONS

Alvarenga, Lauren; Olympus Corporation: A Video Introduction to Label-Free Nucleus Detection with TruAI Technology, Hamburg, 2020, pp. 1-2, company letter available at https://www.olympus-lifescience.com/en/discovery/a-video-introduction-to-label-freenucleus-detection-with-truaitechnology/.

(Continued)

*Primary Examiner* — Ali Bayat
(74) *Attorney, Agent, or Firm* — Collard & Roe, P.C.

(57) ABSTRACT

A method, a device, and a computer program product captures microscopy objects in image data that includes first images recorded with a first contrast and second images recorded with a second contrast, wherein in each case, one of the first and one of the second images can be correspondingly assigned to each other. The method includes capturing information indicating microscopy objects in at least one of the second images, transferring the captured information to those of the first images which correspond to the at least one of the second images, and capturing information indicating microscopy objects in the first images, to which the captured information of the second images was transferred by using the transferred information.

18 Claims, 6 Drawing Sheets

(56) References Cited

U.S. PATENT DOCUMENTS

2021/0350169 A1* 11/2021 Ye .......................... G16H 30/40
2023/0040513 A1* 2/2023 Ryan ...................... G06V 20/52

OTHER PUBLICATIONS

Ling, Chenyi, et al. Analyzing U-Net Robustness for Single Cell Nucleus Segmentation from Phase Contrast Images, In: Proceedings of the IEEE/CVF Conference on Computer Vision and Pattern Recognition Workshops, 2020, pp. 4157-4163.

* cited by examiner

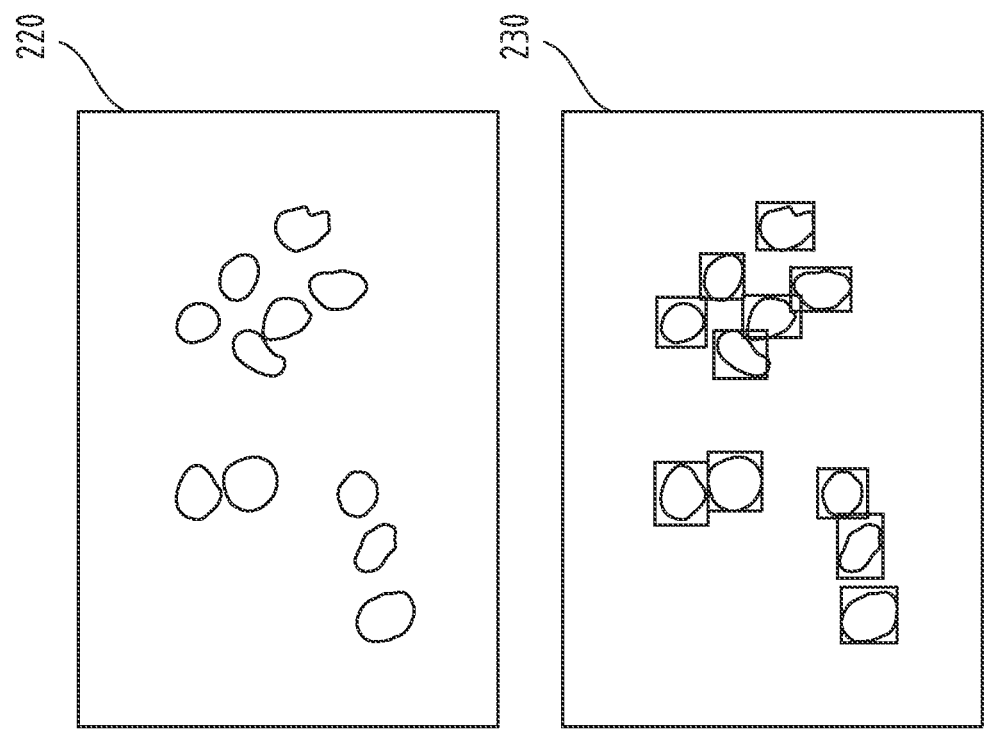
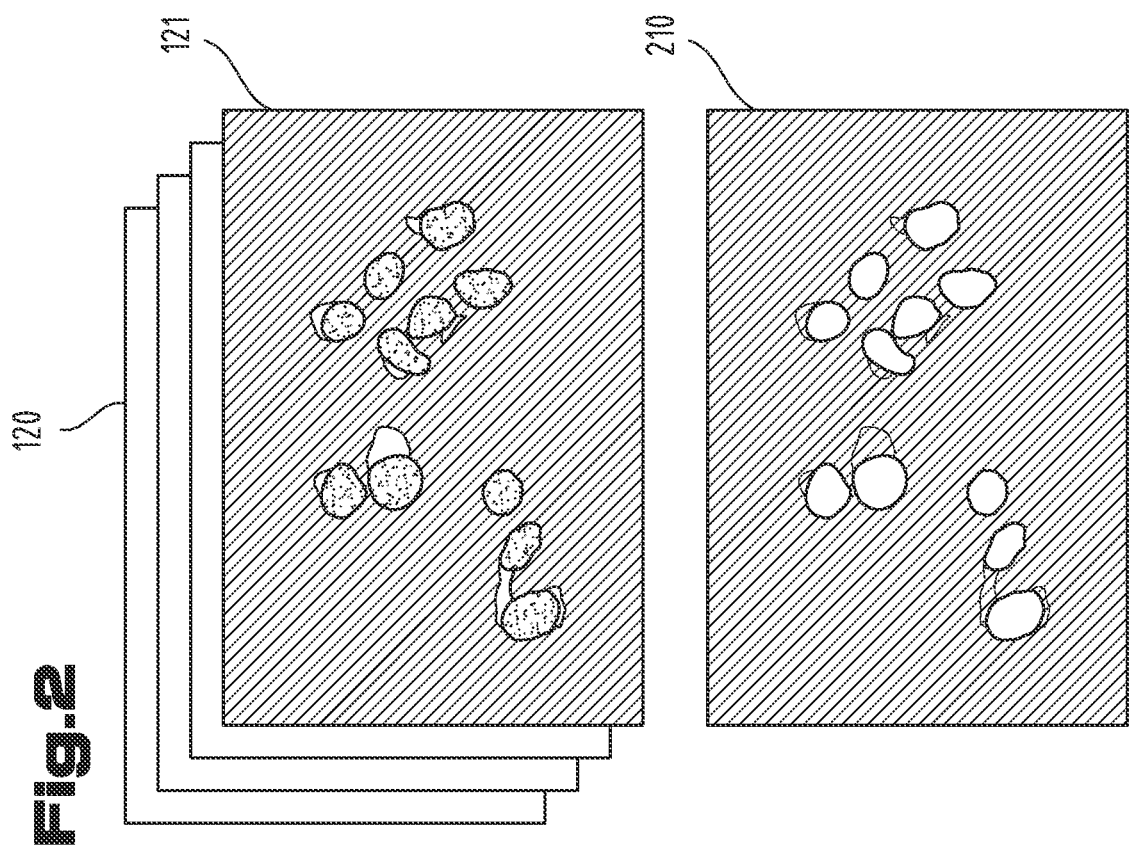
Fig.2

METHOD AND DEVICE FOR CAPTURING MICROSCOPY OBJECTS IN IMAGE DATA

CROSS REFERENCE TO RELATED APPLICATIONS

Applicant claims priority under 35 U.S.C. § 119 of German Application No. 10 2021 114 351.9 filed Jun. 2, 2021, the disclosure of which is incorporated by reference.

BACKGROUND OF THE INVENTION

1. Field of the Invention

The invention relates to capturing microscopy objects in image data, such as images of cells or cell components, for example.

2. Description of the Related Art

In order to improve the visibility of cells in images or when observing them under a microscope, it has proven useful to mark and/or to transfect these cells with a marker, for example a dye or even a fluorescent dye. In the field of cellular biology, the term transfection generally refers to introducing foreign DNA (deoxyribonucleic acid) or RNA (ribonucleic acid) into animal cells and in some cases also other eukaryotic cells. Eukaryotic cells are particularly understood to mean the cells of animals, plants, and fungi.

However, in the context of this document, transfecting refers to generally introducing material foreign to the cell, for example a marker, such as a dye or fluorescent dye, into any type of cell or any part of any type of cell. Accordingly, prokaryotes, that is cellular organisms without a nucleus, i.e. bacteria and archaea, can also be transfected with a marker.

The object of this transfection is to achieve a better visibility of the cell components in order to improve the optical identifiability for an observer. For this purpose, a marker, e.g. dye, is introduced into a cell or components thereof, and then the treated region is recorded photographically or observed.

The shortcomings of conventional transfection are, for example, that sometimes some cells do not take on the marker and/or dye and are thus not visible in the dyed image and/or in the fluorescent image. These are also called missed transfections. Usually, the dyed sample is photographed and/or observed under different conditions, such as a changed brightness contrast.

A further disadvantage is a possible, undesired leaking of the dye (stain) into regions of the sample which are not actually meant to be dyed (also referred to as stain bleeding), also called incorrect marking of non-intended objects. In this process, for example during nuclear staining, the fluorescent DNA bleeds out of the nucleus into the surrounding cell plasma and forms so-called "bleeding stains". Thus, more than originally intended is glowing in the fluorescence contrast image. Likewise, this also often results in large pieces of fuzz, or the like non-intended objects, glowing in the image. According to the usual techniques, these regions would therefore also be classified as objects of interest. In order to fix this mistake in common microscopy, for example filtering based on application-based values is necessary. For example, a nucleus has a maximum size 20 pixels, depending on the respective resolution. As a result, oversized objects such as fuzz can be filtered out.

FIG. 6A shows an undyed sample of cells in a normal view. FIG. 6B shows an error-free coloring of all cells. FIG. 6C, in contrast, shows the realistic normal state in which some cells have not been transfected. The dashed circles indicate positions at which cells are present, which, however, have not taken on any marker or dye and are therefore not visible in the fluorescent staining.

This is critical for many microscopy applications. An example for an application in which the non-transfected cells are problematic is the training of virtual staining models. Due to the non-transfected cells, these virtual staining models are trained with a false ground truth, resulting in a significant loss of quality of these models. In this context, non-transfected cells must therefore absolutely be kept out of the training.

Further examples for applications are:
the training of a segmentation method in which the annotations are created by chemical annotation (for example by threshold values),
training of a virtual dying method, which additionally uses mask annotations, in order to adapt the training signal in cell regions,
counting cells based on the fluorescence signal,
co-localizing a marker with the aid of another marker, and
lineage tracing of cell developments over time.

SUMMARY OF THE INVENTION

The object of this invention was to overcome the shortcomings of the prior art and to improve the capturing of microscopy objects in images and to thus also better identify non-transfected cells. Subsequently, these additionally identified microscopy objects can then be processed further either together with the microscopy objects identified by transfection or separately, depending on the intended purpose.

This object is achieved by means of a device and a method according to the invention.

For the purpose of better understanding of the invention, it will be elucidated in more detail by means of the figures below.

In the present document, microscopy objects in may be, for example, cell positions, although they also comprise cells or parts of cells, such as cell walls, cell organelles, nuclei, etc. Generally, microscopy objects refer to objects recorded under a microscope. This includes the actual examination objects, such as cells, tissue, and other objects to be examined. However, the images may also show the tools used therefor, such as object slides, Petri dish, etc. There may also be images on which no objects to be examined are no longer visible, for example because the images have reached and passed the edge of the sample. These images may also be available in the image data, wherein no microscopy objects, i.e. components of the sample, can be captured thereon.

In the present document, contrast refers to special contrasts common in microscopy in addition to the ordinarily common brightness contrast. Examples for this are both non-fluorescence contrasts and fluorescence contrasts, such as color contrasts, brightfield method, darkfield method, phase contrast method, phase gradient contrast method, polarization method, differential interference contrast, DIC, method, reflected-light microscopy method, digital contrast method or the like, such as a variety of RGB (red, green, and blue) signals after chemical dying, or hyperspectral data.

BRIEF DESCRIPTION OF THE DRAWINGS

Other objects and features of the invention will become apparent from the following detailed description considered in connection with the accompanying drawings which respectively show a very simplified representation. It is to be understood, however, that the drawings are designed as an illustration only and not as a definition of the limits of the invention.

In the drawings,

FIG. 2 shows different options to optimize capturing microscopy objects according to the present invention;

DETAILED DESCRIPTION OF PREFERRED EMBODIMENTS

First of all, it is to be noted that in the different embodiments described, equal elements are provided with equal reference numbers and/or equal element designations, where the disclosures contained in the entire description may be analogously transferred to equal elements with equal reference numbers and/or equal element designations. Moreover, the specifications of location, such as at the top, at the bottom, at the side, chosen in the description refer to the directly described and depicted figure and in case of a change of position, these specifications of location are to be analogously transferred to the new position.

As an example, it is described here that the cells can be identified which do not take on a certain marker, for example a dye (for example 4',6-diamidino-2-phenylindole, DAPI for short, as a fluorescent dye used in fluorescence microscopy for marking DNA), meaning they were not correctly transfected. Other currently used dyes are Hoechst 33342, NucSpot, Spirochrome SPY, GFP (green fluorescent protein) and tdTomato.

The computer-implemented method according to the invention for capturing microscopy objects in image data is described, wherein the image data comprises first images recorded with a first contrast and second images recorded with a second contrast, wherein in each case, one of the first and one of the second images can be correspondingly assigned to each other. The images assigned to each other show essentially the same, i.e. the same cells, the same microscopy object, or also an empty area if neither cells nor other microscopy objects are pictured. The method comprises capturing information indicating the microscopy objects in at least one of the two images. Subsequently, the captured information is transferred to those of the first images which correspond to the at least one of the second images. Then, information indicating microscopy objects is captured from the first images, to which the captured information of the second images was transferred by using the transferred information.

Figure 1:
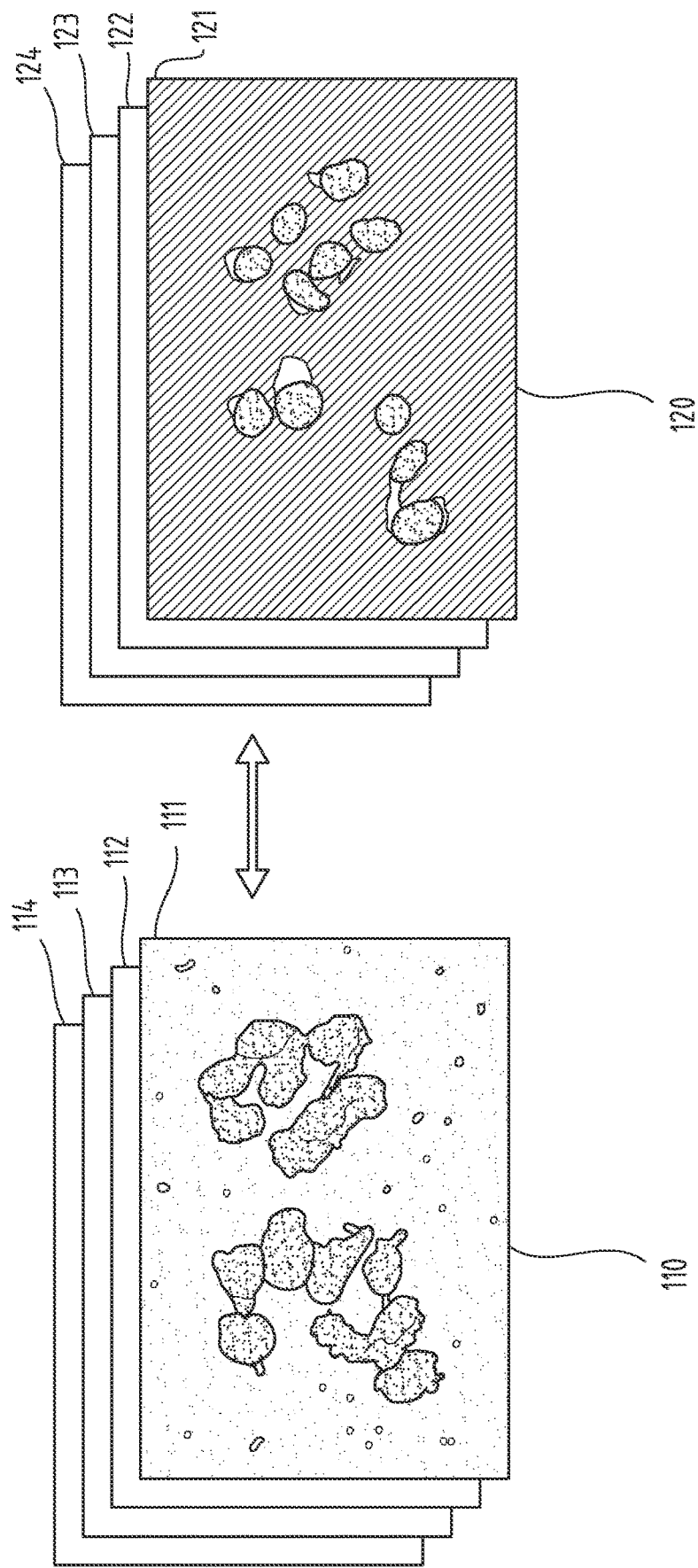
FIG. 1 shows images of cellular samples in two different contrasts, recorded according to the present invention.

FIG. 1 shows images of cellular samples recorded with two different contrasts. On the left, first images 110 are shown which were recorded with a first contrast. In the figure, some of the first images 110 are shown, namely images 111 to 114. On the right side, second images 120 are shown, which were recorded with a second contrast. In the figure, some of the second images 120 are shown, namely images 121 to 124.

A set of first and/or second images may of course consist of an arbitrarily large or small number of images, wherein, in the figure, four images are shown in each case by way of example.

In this regard, images 111 and 121 shown the same cells, cell components, or the same cutout from a cell, each recorded with a first and a second contrast, respectively. Likewise, the image pairs 112 and 122, 113 and 123, and 114 and 124 can be assigned to each other.

In the image with a non-fluorescent contrast 111, for example different cells can be seen. In comparison with the corresponding image with a fluorescent contrast 121, it becomes obvious that some cells did not take on the marker, i.e. the dye, and are therefore not visible in image 121.

The cells which did take on the marker, however, can be automatically identified more easily in image 121, e.g. by means of image recognition, as the fluorescent contrast simplifies this considerably.

FIG. 2 shows different options to optimize capturing microscopy objects within the context of this image recognition and is to serve as an illustration of the step 200, capturing information indicating microscopy objects in at least one of the second images 120. The image on the top left shows the images 120 in their basic state. The image on the bottom left is to illustrate that capturing the positions can be improved by means of low-pass filtering 210. The image on the top right is to illustrate that capturing the positions can be improved by means of carrying out at least one threshold value operation 220. The image on the bottom right is to illustrate that capturing the positions can be improved by means of finding connected contours 230. These improvements may also be used in any combination. Alternatively or additionally, similar image-processing segmentation methods may be used. Again, different combinations are possible. Examples for this is a model of machine learning, watershed transformation, GraphCut-based approaches, finding boundary shapes, segmentation, bandpass filtering, high-pass filtering, finding connected contours, and/or similar image-processing segmentation methods. Filtering for one or multiple predetermined parameters, such as maximum or minimum surface, circularity, density, or similar parameters of the sample, is also conceivable.

Furthermore, the captured information 310, in particular the found regions 230, can optionally also be modified, i.e. edited, manually, i.e. by a user, by having it either confirmed after checking, if the regions contain corresponding microscopy objects, whereby they can optionally be allotted a greater weight, or deleted if the regions do not contain corresponding microscopy objects.

A user may also provide additional information, for example regarding positions or regions in which the objects and/or no objects are located. These annotations may simplify, accelerate, and improve the training.

Capturing information indicating microscopy objects in the second images 120 may also be carried out using shapes of presentation, for example using boundary shapes. Such boundary shapes are preferably circles, polygons, masks, or the like. Alternatively, heat maps or probability maps may be used. In probability maps, about every pixel of the second image is assigned a probability of a "cell" or another microscopy object being present there.

Accordingly, in the images 120, the cells in the fluorescent images can be located automatically, and thus their positions can be determined. Especially in the case of DAPI colorings, this is easily possible as the cells are visible as well-separable objects in the images. Additionally, the found cells are mostly cells which were transfected certainly as they are visible in the fluorescence, after all.

Automatic locating and capturing of the positions takes place by means of image recognition methods, for example with the aid of a machine learning model which was trained using images with the same contrast as the second images.

Once the cells are located, corresponding information 310 describing the microscopy objects is captured. Such information indicating the position may be illustrated in the form of image coordinates indicating the microscopy objects. Alternatively, the microscopy objects may also be defined by regions containing the cells. In this regard, the regions may be boundary shapes, such as circles, polygons, heat maps, masks, or the like. In this regard, the size of the regions may be predetermined and depend on the microscopy objects captured in the second images 120, or be determined on the basis of given context information, such as cell type, application, user input, or the like. The size of the regions may be predetermined depending on, for example, the maximum or minimum surface, circularity, density, or similar parameters of the sample.

Based on the cell type, for example, an expected size of the nuclei can be determined for their localization in the DAPI channel. This may occur, for example, based on a threshold value and/or due to conditions for finding connected regions. As a result, a "clumping" of individual cells upon extraction of the masks can be prevented, and/or such cells may be correctly identified.

Figure 3:
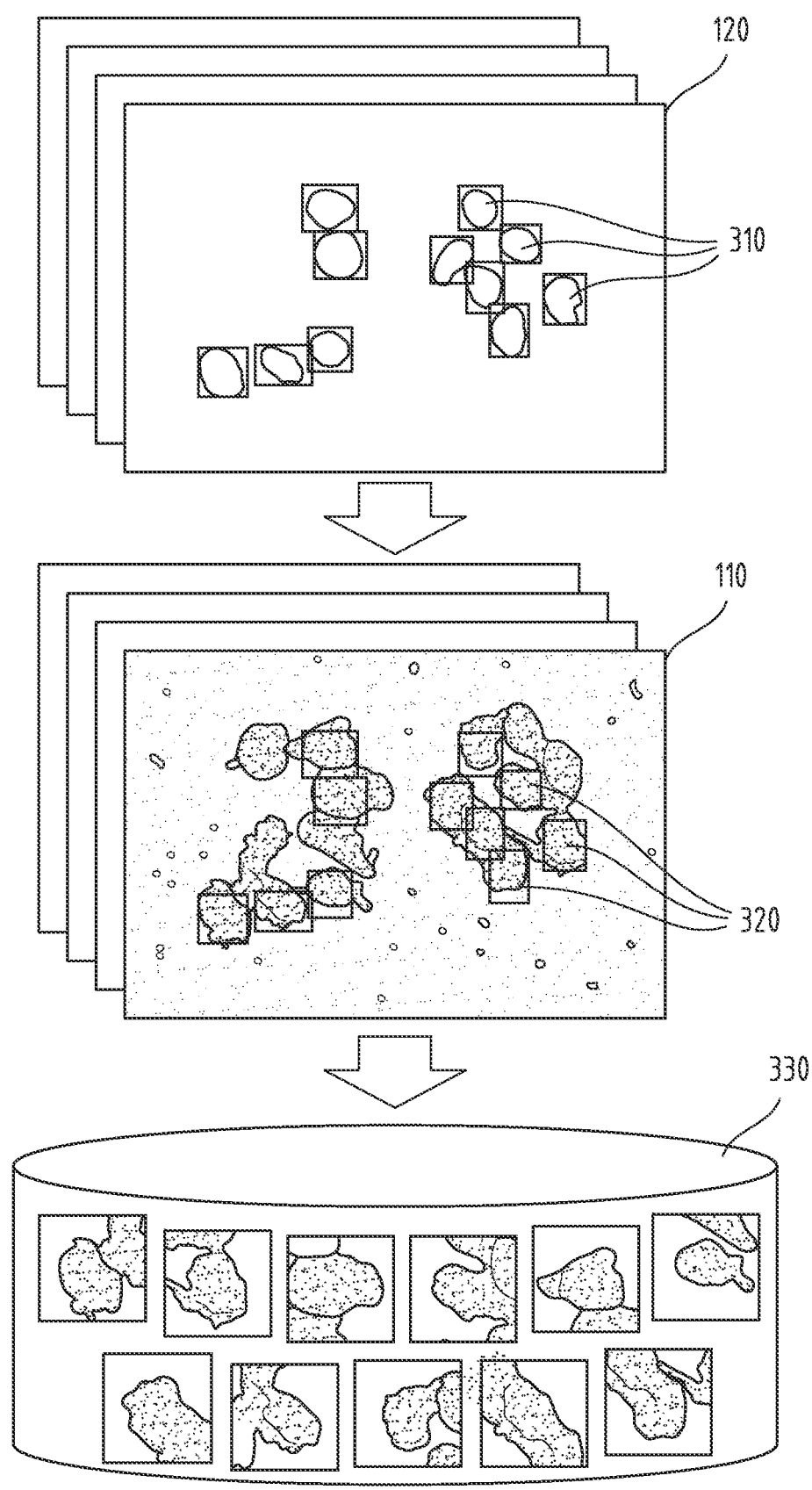
FIG. 3 shows the transfer of identified microscopy objects in an image, which was recorded with a contrast, to a different, related image, which was recorded with a different contrast, according to the present invention.

FIG. 3 shows the transfer of identified microscopy objects in one image, which was recorded with a contrast, to a different associated image, which was recorded with a different contrast, and is to serve to illustrate the step 300 of transferring the captured information to those of the first images 110 which correspond to the at least one of the second images 120.

The positions 310 captured in the second images 120 are thus transferred into the corresponding first images 110, which can be seen in the figure as positions 320. Specifically, the information regarding which positions 310 microscopy objects assume in the second images 120 are transferred to the corresponding first images 110, i.e. a position in a second image is assigned to a corresponding position on the corresponding first image. As the images each show the same cutout, the cells easily located in the second images are at the same locations in the first images. In the figure, it can be seen that the located regions or the like are transferred to the respectively corresponding non-fluorescent images. The identified cells may also be stored separately in a storage 330.

For the contrasts initially not registered, a registration hast to take place during the transfer step, i.e. a correspondence determination of pixels between a first image and a second image. This is the case, for example in the histopathology applications in which the two contrasts are not depicted instantaneously by the same beam path.

Subsequently, in step 400, information indicating microscopy objects is captured in first images 110. The information captured in the second images 120 was transferred to these first images 110. Capturing the microscopy objects in the first images 110 takes place using the transferred information.

Automatic locating and capturing of the positions takes place by means of image recognition methods, for example with the aid of machine learning and/or by using of a trained machine learning model, which was trained by images with the same contrast as the first images.

The capturing 400 in the first images 110 may also comprise training a machine learning model. In this process, a model is trained with the positions of the cells which are now known in the first images 110. They are now known because they were transferred from the second images 120. The training data is thus the first images and/or some of the first images.

If the model is trained using some of the first images 110 and the positions captured from the second images 120, the remaining images 110 can then be identified automatically.

Alternatively, the model may also be trained using a different set of images, recorded with the same contrast and having similar image contents, for example similar cells. Retraining the model afterwards, however, is still possible.

Subsequently, the information indicating the microscopy objects in the first images 110 is identified by applying the trained machine learning model.

The machine learning model may be an artificial neural network, preferably a deep artificial neural network. The machine learning model may be a classification model, in particular a one-class classifier. This one-class classifier may, for example, be designed as a one-class feature classifier, in which the transferred image regions of the microscopy objects in the input image are described by an object representation (so-called features), for example by activations of a convolutional neural network (CNN activations), by histograms of oriented gradients, or by bags of visual words histograms.

The one-class classifier may be configured to learn a common description of the microscopy objects, which exist represented by features (as described above). This may take place, for example, by means of a Parzen density estimation, Gaussian mixture models (GMM), support vector data descriptions (SVDD), a one-class support vector machine (1-svm), Kernel Null Foley-Sammon transformations (KNFST), or by means of Gaussian process regression models.

After completed training, such a feature classifier may be applied to any possible partial image in the input image in order to assess the corresponding feature representation of each such partial image to the probable affiliation to the quantity of the searched-for microscopy objects.

In an alternative embodiment, the one-class classifier may be designed as a detector, meaning a one-class detector, for example using an exemplary support vector machine (exemplary SVM). After completed training, such a detector may directly detect the probable positions of all searched—for microscopy objects in the input image.

In a further alternative embodiment, the one-class classifier may be designed as a model with pixel-precise locating. This may take place, for example using a generative model, such as self-encoding neural networks (auto encoders) or variational auto encoders or also invertible neural networks. When training these models, for example reconstruction-based error metrics are minimized, which, within the meaning of the present invention, are limited to the regions in the input image underneath the transferred mask, for example. A design using auto-regressive generative models (for example a pixel convolutional artificial neural network (PixelCNN) is possible. In such cases, pixel-precise locating of regions probably belonging to the quantity of the searched—for microscopy objects may take place after training the models.

Figure 4:
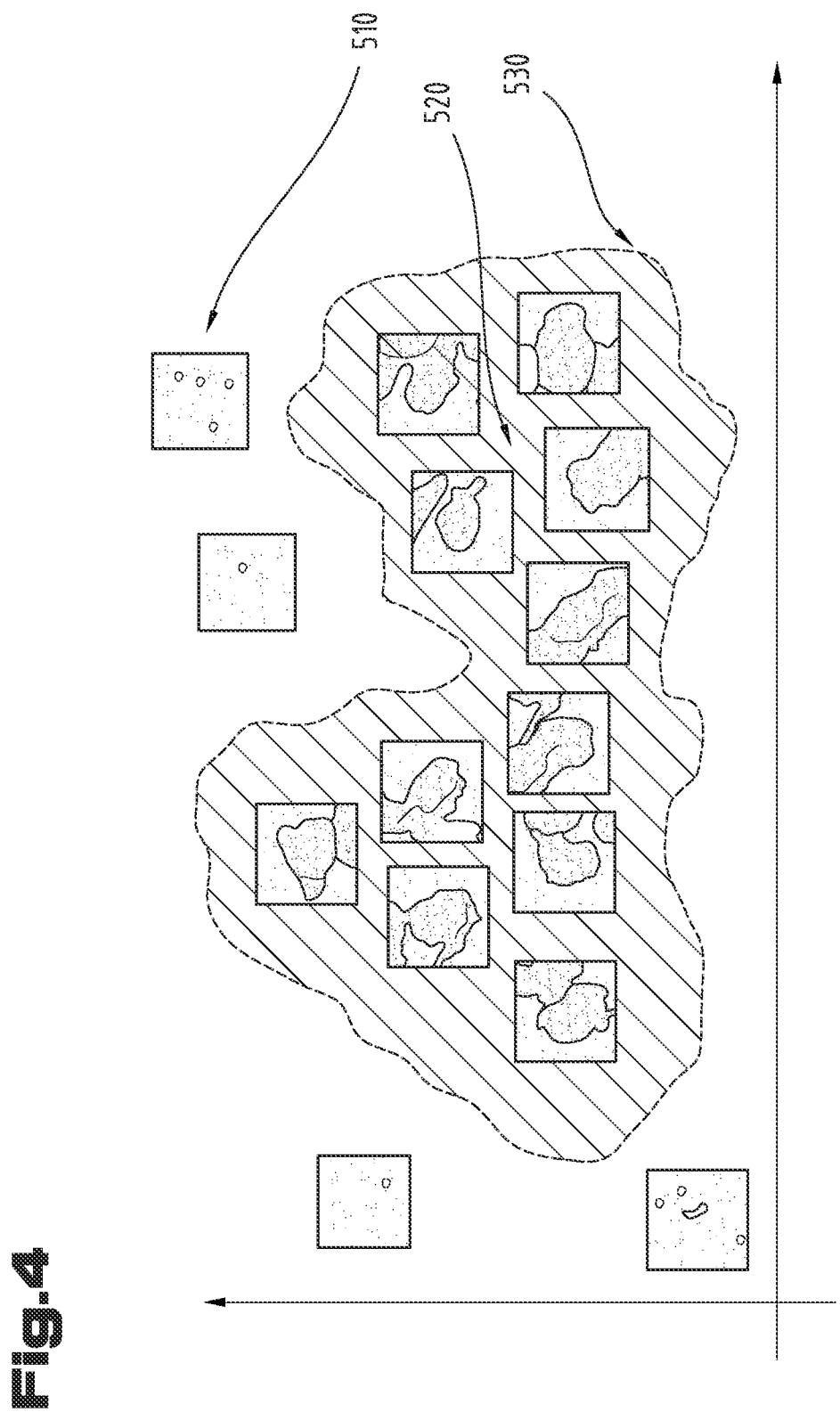
FIG. 4 shows training of a one-class classifier according to the present invention.

FIG. 4 shows the training 500 of a one-class classifier. Here, for example a one-class classifier (OCC) is trained for the non-fluorescent image regions of the cells located in step 300.

Figure 5:
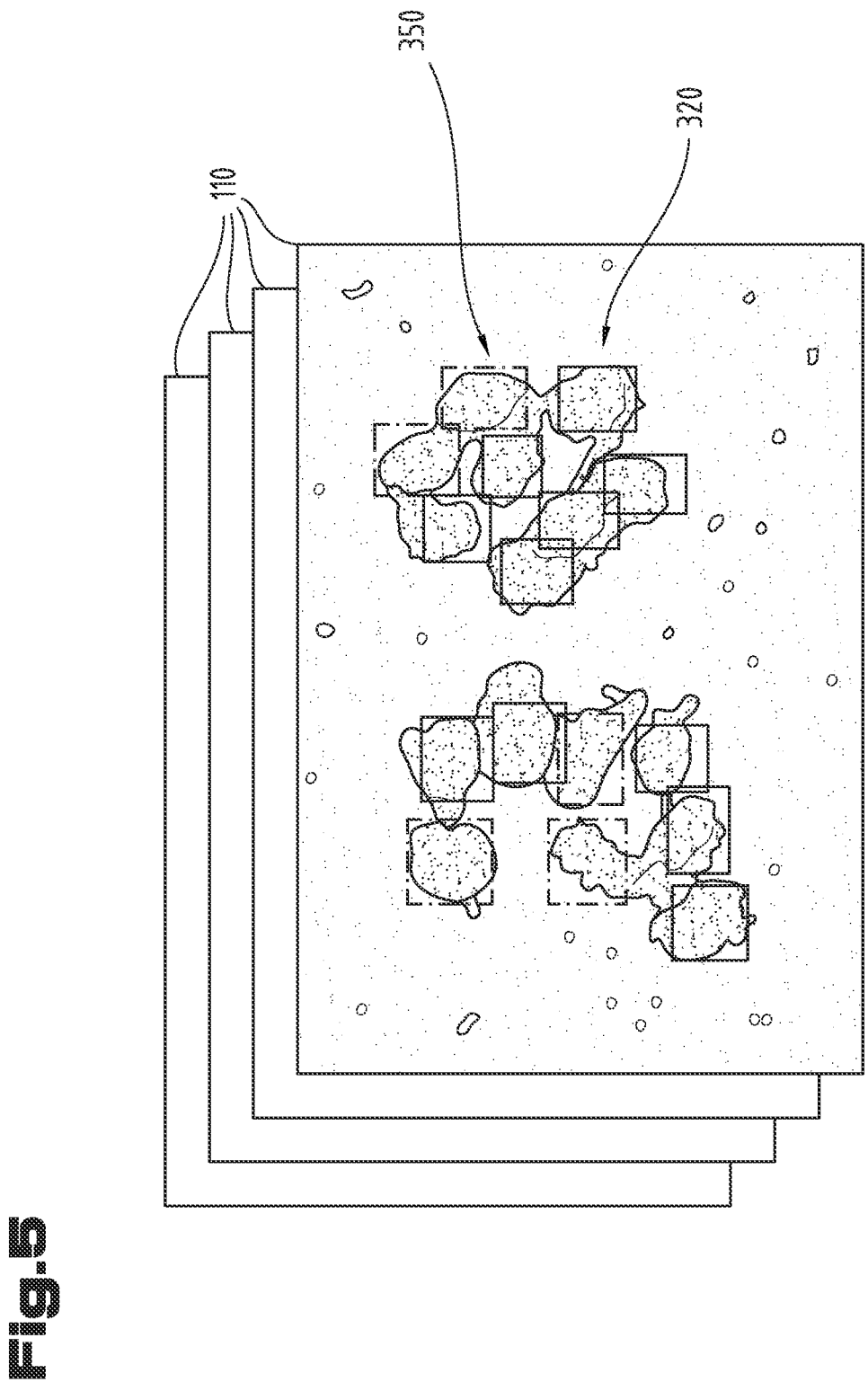
FIG. 5 shows capturing microscopy objects in the first images according to the present invention.
Figure 6A:
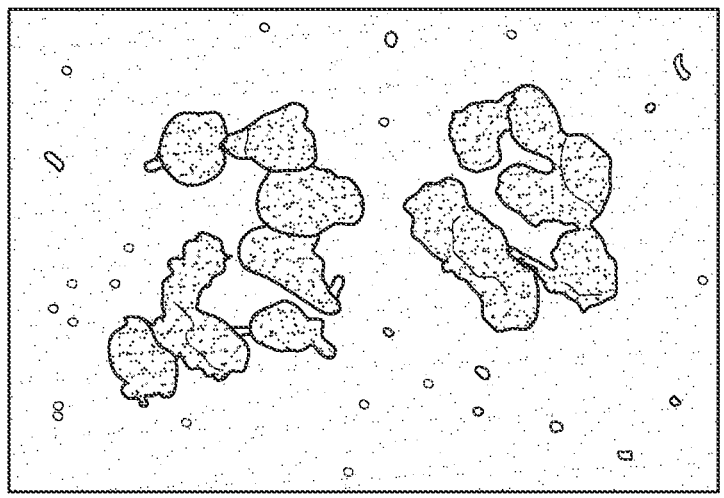
FIGS. 6A-6C show dyed and undyed depictions of cells or cell components according to the prior art.
Figure 6B:
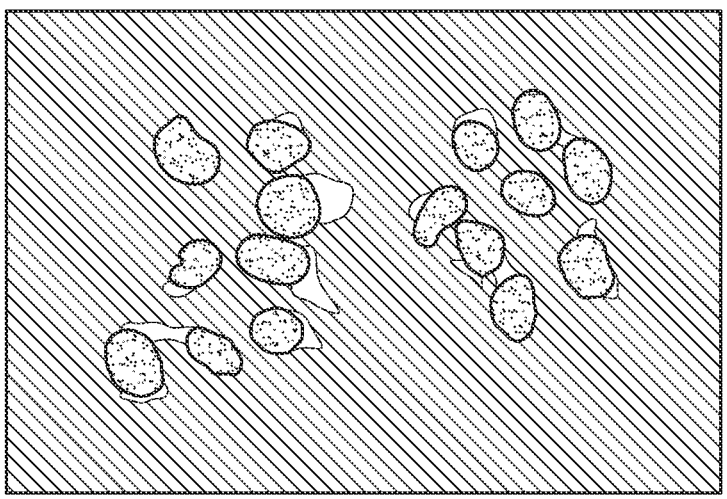
Figure 6C:
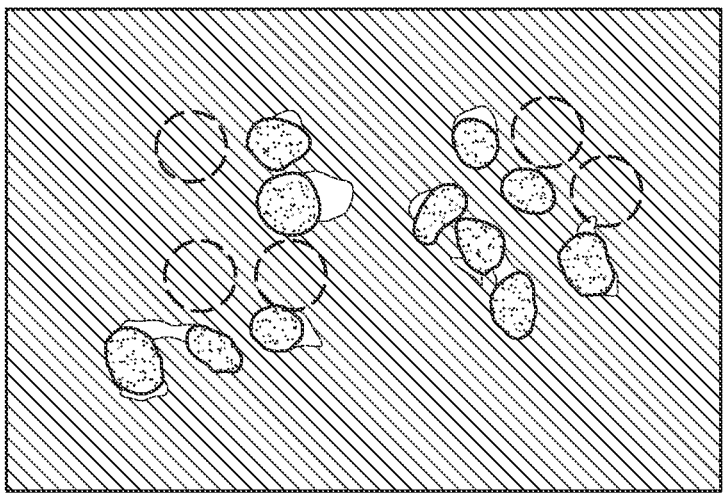

On the X-axis and/or Y-axis, two of the learned and/or depicted feature dimensions are shown. In FIG. 5, the learned OCC decision boundary is marked with 530. The microscopy objects 520 existing therein are available for training, they correspond with the microscopy objects in the first images 110 captured in the second images 120. The positions 510 outside the limit 530 symbolize example which do not contain cells but are not used for training an OCC.

A further alternative is that not all of these positions 520 are used for training but only some of them. For example, those identified particularly certainly in the second image. These can be verified by a user as a "true cell", for example in order to exclude regions of erroneously leaked colorations from the training data set. These gained security is particularly important for an OCC model. An OCC model does not need much more data in the present application, which is why a human-verified part of an otherwise significantly larger data set may be sufficient.

Furthermore, some of these positions 510 may also alternatively be annotated as "truly no cell" by a user, for example in the input image. The user may also mark additional positions before the model is trained, in order to generate additional training data. In this case, it is even possible to switch from the approach of the one-class classification model described above to a model of monitored learning, for example a two-class feature classifier (binary classifier) or a binary semantic segmentation model.

A user may also provide additional information, for example regarding positions or regions in which the objects and/or no objects are located. These annotations may simplify, accelerate, and improve the training.

When comparing the first 110 and second 120 images, it can be determined that the first images 110 recorded with the first contrast show all cells, although these cannot be automatically identified well. By contrast, the second images 120 recorded with the second contrast show cells which are certainly present, although cells may be missing or are incomplete in the second images.

By way of example, FIG. 5 shows the step 400, in which new microscopy objects 350 are captured in the first images 110 by using the information indicating microscopy objects, which was captured in the second images 120 (as information 310) and transferred to the first images 110 (as information 320).

In the figure, the transferred information 320 is marked by a marking with a solid line for purposes of better representation, while the newly captured information 350 are marked by a dashed line.

Capturing the microscopy objects 350 in the first images may also be improved by the measures described in the context of FIG. 2.

Capturing information indicating microscopy objects in the first images 110 may also be carried out using shapes of presentation, for example using boundary shapes. Such boundary shapes are preferably circles, polygons, heat maps, masks, or the like.

Accordingly, in the images 110, the cells in the non-fluorescent images can be located automatically, and thus their positions can be determined. By capturing the microscopy objects 350 in the first images 110 all present cells can be located. Cells, which in this process have not already been found in the previous step 200—that is in the second images 120—can only be recognized as not correctly transfected.

Once the cells are located, corresponding information indicating the microscopy objects is captured. Such information indicating the position may be illustrated in the form of image coordinates indicating the microscopy objects. Alternatively, the microscopy objects may also be defined by regions containing the cells.

In this regard, the regions may be boundary shapes, such as circles, polygons, heat maps, masks, or the like. In this regard, the size of the regions may be predetermined and depend on the microscopy objects captured in the second images 120, or be determined on the basis of given context information, such as cell type, application, user input, or the like.

If the microscopy objects were captured in the first and second images, they can be further processed either together or separately. In the example, the cells captured in the second images are correctly transfected cells, whereas the cells captured in the first images are all cells. If only the additionally captured cells are considered, these are the cells which were not correctly transfected.

Of course, the description above may also refer to "the objects captured with the second contrast"/"the objects captured with the first contrast" instead of "transfected cells"/"not (correctly) transfected cells", as the method does not only relate to transfection but rather can be used in any method using two contrasts. The first and the second contrast may also both be a fluorescence contrast and even the same fluorescence contrast. Likewise, the first and the second contrast may both be a non-fluorescence contrast and again even the same non-fluorescence contrast.

Moreover, the ratio of the captured microscopy objects in the second images to the captured microscopy objects in the first images can be determined. In the example of transfection, this would result in the transfection rate, which may offer valuable information for the used marker or the cells to which it was applied.

It is also possible to determine whether cells captured in the first images correspond with cells whose information was transferred from the second images, by using a threshold value of a similarity measure.

This similarity measure may be a probability measure or also the measure of overlap of boundary shapes, such as circles, polygons, heat maps, masks, distance between centers, or the like.

Finally, it should be mentioned that the information indicating the microscopy objects, a storage format of the information and/or of the images, and/or a coding of the information and/or of the images may be adjusted by means of context information.

Such context information may be the cell type, application, user input, used types of contrast, number of cells in the image, cell density, preferably the average cell density, magnification, image field size, depth of field, type of objective, type of sensor, type of filters in the beam path, type of other optical components in the beam path, information on lighting, average transfection rate, or the like.

As a specific example, the cell type may influence the file format of the image data, for example. Or the cell density may influence whether the information indicating the microscopy objects are boundary shapes or coordinates.

In other words, capturing microscopy objects can be improved as explained in the following with the aid of an example. In this regard, particularly the principle is to be explained using a specific example, wherein it is obvious that all modifications described above may also be used. In particular, the explanation with the aid of the pairing of fluorescence contrast/non-fluorescence contrast as the contrasts used for the first 110 and second 120 images merely serves as an example. All other contrasts may also be used, as described above.

Image data of a sample must be provided or recorded. This image data consists of first images 110 of the sample, which are recorded with a first, for example non-fluorescence contrast (e.g. brightfield, DIC, phase contrast, phase gradient contrast, etc.), and respectively corresponding (to the first images 110, for example registered in a database) second images 120, which are recorded with a second contrast, for example a fluorescence contrast. In this regard, it is important that in each case, one image of the first images 110 and one image of the second images 120 correspond to one another, so that it is possible to transfer the microscopy objects (step 300). Alternatively, it must at least be possible to register or assign them to one another, for example based on meta data or also by means of an image analysis.

In the second images 120, for example the fluorescent images, all cells are located automatically. In the second images 120, the cells are transfected certainly as they are visible in the fluorescence contrast, after all. The cells found this way are definitely transfected correctly as they are visible in the fluorescence contrast, after all. The same applies to other, non-fluorescence contrasts, depending on which contrasts were selected for the first and/or second contrast. Incorrectly and/or non-transfected cells are not yet found here. Cells in the fluorescence contrast can be automatically identified and located significantly more easily and solidly than in the non-fluorescence contrast.

This is true particularly for the often-occurring case that the target contrast is the DAPI (nucleus) dye. In this regard, individual cells appear distinctly separated as oval shapes in the corresponding fluorescence photograph and can be located very easily with basic image processing. A possible approach for automatically finding cells in the DAPI fluorescent images is:

i. receiving a DAPI fluorescent image
 ii. low-pass filtering the image
 iii. performing a threshold value operation
 iv. finding connected contours, wherein each contour corresponds with a cell.

Of course, further and/or different approaches are also conceivable, as described above.

The thus determined microscopy objects are then transferred into the images of the non-fluorescence contrast, providing image regions in non-fluorescent images, in which cells are definitely present. Transferring the cell positions is deemed to be admissible as images corresponding to one another (i.e. 111 and 121, 112 and 122, etc.) are registered to one another. This means that the image coordinates of a cell found in a fluorescent image are identical to the image coordinates in the respectively corresponding non-fluorescent image. Generally, not only coordinates are transferred, but transferring regions is possible, as well. In the simplest case, these are bounding boxes. However, circles, polygons, etc. may also be used. The sizes of these regions may, for example, be fixed, or be determined based on the fluorescent image, or be adjusted based on context information (cell type, application, user input, etc.). This, as well, refers merely to the transfected cells captured in the second images 120. Masks are also conceivable for transferring the captured information. Said mask would then be automatically generated for each image and then also be linked to this image (and the corresponding second image) and possibly be stored together.

As an option, the found connected contours could, by way of example, be reduced using application-specific filters, for example to be able to eliminate large, glowing pieces of fuzz. Filtering for application sizes is also possible, for example filtering for contours falling below or exceeding predefined sizes or having a certain shape, such as a circle, ellipsis, etc., within specific parameters.

Within the context of capturing the microscopy objects in the first images, a one-class classifier may now—as an option—be trained for the located image regions of the non-fluorescent images definitely containing cells. For this, only positive examples are required as it is an OCC. This means that the OCC learns what cells look like in the non-fluorescence contrast (without explicitly learning what non-cells look like in the process). Thus, the non-transfected cells which are present and visible in the non-fluorescent image but were not found in the steps 200 and 300 and not transferred are not understood as negative examples and are subsequently identified by the OCC simply as a "cell", just like the correctly transfected cells.

Possible features for the OCC may be, for example: preferably image features from the non-fluorescent image, alternatively image features from the fluorescent image. The second alternative is not optimal as the non-transfected cells are presumably not even visible in the fluorescent images, possibly, however, dyed structures at different wavelengths. A further alternative is a combination of the two previously mentioned features.

In this regard, the one-class classifier as an example for a machine learning model may, for example, be realized as a one-class feature classifier or as a one-class detector or as a model with pixel-precise locating, as explained above.

In some circumstances, as explained above, a machine learning model of monitored learning may be used, for example a binary feature classifier or a binary semantic segmentation model.

The trained model may then be applied to the complete entirety of the non-fluorescent images. In the non-fluorescent images, this uncovers all cells, even those which are not visible in the fluorescent image due to a missed transfection. In this regard, both transfected cells and non-transfected cells are found, as the non-transfected cells did not influence the training as negative examples, but were simply ignored, as explained above.

By means of a comparison to the cells previously found in the second images, these may also be divided into a) correctly transfected cells, which were found both in the first and in the second images, and b) non-transfected cells, which were only found in the first images.

The thus-gained information on incorrectly transfected cells can subsequently be used in a variety of ways. Some examples for this are:

Determining a transfection rate, which is the share of the correctly transfected cells in the quantity of all transfected cells. The transfection rate is a very important metric for assessing workflows, for quality assurance, or for assessing the state of cell cultures, etc.

Eliminating the incorrectly transfected cells from the training data set of a subsequent training. This is particularly relevant for so-called virtual dying.

Using the incorrectly transfected cells as a qualitative test data set for virtual dying, wherein the cells are used to predict fluorescence. The advantage of this is that it ensures that the virtual dying models does not memorize this data, as there is no ground truth for these cells, i.e. in the fluorescent image. As a result, an assessment of the generalizability of virtual dying models is possible. The test data set may also be used for applications in which no virtual dying is to take place, but where a test is to be carried out directly based on the input contrast.

Re-transferring the regions of the incorrectly transfected cells into the fluorescent image. Thereby, a classifier, detector, or the like can be trained, which can identify incorrectly and/or non-transfected cells from the fluorescent image. Thereby, a "fingerprint" left behind due to a missed transfection, which may also be only faintly perceptible, can be identified and/or trained in the fluorescent image, which does not necessarily have to be obviously identifiable or identifiable at all to human experts. A suitable machine learning model has simultaneous access to both images.

Indicating the critical regions, i.e. where problems occurred during identification, and then requesting a user input regarding further actions. A human post-classification may also take place at this point.

Of course, combinations of the types of use mentioned here are possible.

The thus described method is advantageous with respect to the prior art, as the conventional, in particular manual, searching of training data for incorrectly transfected cells is very time-consuming. Conventional detectors/patch classifiers trained for non-fluorescent images require negative data in addition to the positive data. However, according to the prior art, this data must be input by users, which therefore have to annotate the complete data set almost flawlessly, i.e. without false-positive and/or false-negative cell annotations, which is very laborious.

A further problem of the prior art is that the thus learned/trained detector is dependent on sample, i.e. the training must be carried out anew for different experiments/types of samples/etc., wherein a plurality of manual annotations are required each time.

The method according to the invention, in contrast, can perform a re-training in an automated manner, as positive annotations are determined by the fluorescence channel, and negative annotations are not required. In particular, the positive and/or negative annotations can be found with significantly reduced effort.

Current methods for virtual dying do not take incorrectly transfected cells into account, resulting in inconsistent data sets and thus in an exacerbated training and a lower model quality. The consequence in most cases is an undesired overadjustment to surrounding details in order to be able to project the training data set. As a result, the generalizability of the model is very limited.

The exemplary embodiment according to the invention is also a device for capturing microscopy objects in image data, preferably a computer configured to perform a previously described method. The device comprises a transfer device for receiving the image data or an imaging device for recording the image data, which is preferably configured to record images with different contrasts, and particularly preferably a microscope. In this regard, the image data comprises first images recorded with a first contrast and second images recorded with a second contrast, wherein in each case, one of the first and one of the second images can be correspondingly assigned to each other. As described above regarding the method, the images assigned to each other show essentially the same, i.e. the same cells, the same microscopy object, or also an empty area if neither cells nor other microscopy objects are pictured.

The device further comprises a capturing device for capturing information indicating microscopy objects in the first and second images.

The device further comprises a transfer device for transferring the captured information between two corresponding images.

The device may optionally further comprise a storage device for storing the image data and information indicating microscopy objects.

In this regard, the capturing device is configured to consider transferred information during capturing.

A further embodiment is a computer program product with a program for a data processing device, comprising software code sections for performing the steps of the method described above when the program is run on the data processing device.

This computer program product may comprise a computer-readable medium, on which the software code sections are stored, wherein the program can be loaded directly into an internal storage of the data processing device.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims.

Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

Although only a few embodiments of the present invention have been shown and described, it is to be understood that many changes and modifications may be made thereunto without departing from the spirit and scope of the invention.

LIST OF REFERENCE NUMBERS

110 First images
111 A first image
112 A first image
113 A first image
114 A first image
120 Second images
121 A second image
122 A second image
123 A second image
124 A second image 200 Capturing information in the first images
210 Low-pass filtering
220 Threshold value operation
230 Finding contours
310 Positions captured in the second images
320 Information transferred into the first images
330 Storage
350 Additional positions captured in the first images
400 Capturing information in the second images
500 Training a one-class classifier
510 Non-cell positions
520 Microscopy objects training data
530 OCC decision boundary

What is claimed is:

1. A computer-implemented method for capturing microscopy objects in image data, wherein the image data comprises first images recorded with a first contrast and second images recorded with a second contrast, wherein in each case, one of the first and one of the second images can be correspondingly assigned to each other, the method comprising:
capturing information indicating microscopy objects in at least one of the second images;
transferring the captured information to those of the first images which correspond to the at least one of the second images; and
capturing information indicating microscopy objects in the first images, to which the captured information of the second images was transferred by using the transferred information,
wherein the first images recorded with the first contrast show all microscopy objects, whereas the second images recorded with the second contrast show the microscopy objects which are definitely present, although cells may be missing or are incomplete in the second images.

2. The method according to claim 1, wherein capturing information indicating microscopy objects in the first or second images comprises the use of a trained machine learning model, wherein the machine learning model was trained using images having the same contrast as the first or second images.

3. The method according to claim 2, wherein the machine learning model is an artificial neural network.

4. The method according to claim 2, wherein the machine learning model is a one-class classifier.

5. The method according to claim 1, wherein capturing information indicating microscopy objects in the first images comprises:
training a machine learning model with the information transferred to the first images as well as the first images; and
identifying information indicating microscopy objects in the first images by applying the trained machine learning model.

6. The method according to claim 1, further comprising receiving a user input modifying the captured information by
correcting incorrectly captured information, and/or
specifying additional information regarding the positions of objects.

7. The method according to claim 1, wherein capturing information indicating microscopy objects in the first and/or second images is carried out using shapes of presentation.

8. The method according to claim 1, wherein the first contrast, the second contrast, or both contrasts are a non-fluorescent contrast, a fluorescent contrast, or a color contrast, and the first images, the second images, or the first and second images are recorded by one of a brightfield method, a darkfield method, a phase contrast method, a phase gradient contrast method, a polarization method, a differential interference contrast, a DIC, method, a reflected-light microscopy method, or a digital contrast method.

9. The method according to claim 1, wherein capturing information indicating microscopy objects in the first and/or second images comprises one or more of the following:
using a machine learning mode,
watershed transformation,
GraphCut-based approaches,
finding boundary shapes,
segmentation,
low-pass filtering
bandpass filtering,
high-pass filtering,
filtering for predetermined parameters,
performing at least one threshold value operation
finding connected contours, and/or
similar image-processing segmentation methods.

10. The method according to claim 1, wherein transferring the captured information indicating microscopy objects comprises:
transferring image coordinates indicating microscopy objects, and/or
transferring regions containing microscopy objects,
wherein the regions are boundary shapes, and/or
wherein the sizes of the regions are predetermined, determined based on the microscopy objects captured in the second images, or determined based on predefined context information.

11. The method according to claim 1, wherein
the information indicating microscopy objects,
a storage format of the information and/or the images, and/or
a coding of the information and/or the images may be adjusted by context information selected from the group consisting of
cell type,
application,
user input,
types of contrast used,
number of cells in the image,
cell density,
magnification,
image field size,
depth of field,
type of objective,
type of sensor,
type of filters in the beam path,
type of other optical components in the beam path,
information on lighting and
average transfection rate.

12. A device for capturing microscopy objects in image data configured to perform the steps of the method according to claim 1, the device comprising:
a transfer device for receiving the image data or an imaging device for recording the image data,
wherein the image data comprises first images recorded with a first contrast and second images recorded with a second contrast, wherein in each case, one of the first and one of the second images can be correspondingly assigned to each other;
a capturing device for capturing information indicating microscopy objects in the first and second images;

transfer device for transferring the captured information between two corresponding images; and wherein the capturing device is configured to consider transferred information during capturing.

13. A computer-implemented method for capturing microscopy objects in image data, wherein the image data comprises first images recorded with a first contrast and second images recorded with a second contrast, wherein in each case, one of the first and one of the second images can be correspondingly assigned to each other, the method comprising:

capturing information indicating microscopy objects in at least one of the second images;

transferring the captured information to those of the first images which correspond to the at least one of the second images;

capturing information indicating microscopy objects in the first images, to which the captured information of the second images was transferred by using the transferred information; and separating the microscopy objects captured in the first images by means of the information into microscopy objects which were transferred from the second images and microscopy objects which were not transferred from the second images.

14. The method according to claim 13, further comprising a calculation of a ratio of the captured microscopy objects in the second images to the captured microscopy objects in the first images.

15. The method according to claim 13, wherein a threshold value of a similarity measure is used for determining whether cells captured in the first images correspond with cells whose information was transferred from the second images.

16. The method according to claim 15, wherein the similarity measure is a probability measure or the measure of overlap of boundary shapes.

17. A computer program product with a program stored on a non-transitory medium for a data processing device, comprising software code sections for performing a method for capturing microscopy objects in image data, wherein the image data comprises first images recorded with a first contrast and second images recorded with a second contrast, wherein in each case, one of the first and one of the second images can be correspondingly assigned to each other, the method comprising:

capturing information indicating microscopy objects in at least one of the second images;

transferring the captured information to those of the first images which correspond to the at least one of the second images; and capturing information indicating microscopy objects in the first images, to which the captured information of the second images was transferred by using the transferred information, when the program is run on the data processing device, wherein the first images recorded with the first contrast show all microscopy objects, whereas the second images recorded with the second contrast show the microscopy objects which are definitely present, although cells may be missing or are incomplete in the second images.

18. The computer program product according to claim 17, wherein the computer program product comprises a non-transitory computer-readable medium, on which the software code sections are stored, wherein the program can be loaded directly into an internal storage of the data processing device.

* * * * *